US012172266B1

(12) United States Patent
Ahire et al.

(10) Patent No.: US 12,172,266 B1
(45) Date of Patent: Dec. 24, 2024

(54) SYSTEM AND METHOD FOR MEDIA BLASTING A WORKPIECE

(71) Applicant: GrayMatter Robotics Inc., Gardena, CA (US)

(72) Inventors: Avadhoot L. Ahire, Gardena, CA (US); Miguel A. Chavez-Garcia, Long Beach, CA (US); Satyandra K. Gupta, Los Angeles, CA (US); Ariyan M. Kabir, Los Angeles, CA (US); Vihan Krishnan, Los Angeles, CA (US); Ashish Kulkarni, Long Beach, CA (US); Sagarkumar J. Panchal, Los Angeles, CA (US); Christian A. Salinas, Los Angeles, CA (US); Brual C. Shah, San Pedro, CA (US); Rahul S. Thorat, Los Angeles, CA (US); Jeano J. Vincent, Los Angeles, CA (US); Murilo M. Zelic, Long Beach, CA (US)

(73) Assignee: GrayMatter Robotics Inc., Gardena, CA (US)

( * ) Notice: Subject to any disclaimer, the term of this patent is extended or adjusted under 35 U.S.C. 154(b) by 0 days.

(21) Appl. No.: 18/608,533

(22) Filed: Mar. 18, 2024

(51) Int. Cl.
*B24C 7/00* (2006.01)
*B24C 1/06* (2006.01)
(Continued)

(52) U.S. Cl.
CPC .............. *B24C 7/0053* (2013.01); *B24C 1/06* (2013.01); *B24C 1/086* (2013.01); *B24C 3/06* (2013.01);
(Continued)

(58) Field of Classification Search
CPC .... G06V 2201/06; G06V 10/40; G06T 7/001; G06T 17/00; G06T 2207/30164;
(Continued)

(56) References Cited

U.S. PATENT DOCUMENTS

| 5,328,517 A | * | 7/1994 | Cates | B24C 1/003 134/1 |
| 2009/0093192 A1 | * | 4/2009 | Takahashi | B24B 9/065 451/6 |

(Continued)

FOREIGN PATENT DOCUMENTS

KR 101779740 B1 * 9/2017 ............. B24C 1/086

OTHER PUBLICATIONS

KR-101779740-B1 machine translation (Year: 2017).*

*Primary Examiner* — Brian D Keller
*Assistant Examiner* — Marcel T Dion
(74) *Attorney, Agent, or Firm* — Run8 Patent Group, LLC; Peter Miller; Alexander Rodriguez (57) ABSTRACT

A method for media blasting a workpiece includes, during a scan cycle: accessing a first set of images captured by an optical sensor traversing a scan path over the workpiece; compiling the first set of images into a virtual model of the workpiece; accessing a first set of blast parameters; generating a first tool path for a first workpiece region of the workpiece based on a geometry of the workpiece represented in the virtual model and the first set of blast parameters. The method further includes, during a processing cycle: via the set of actuators, navigating the blast nozzle over the first workpiece region according to the first tool path; and projecting blasting media toward the workpiece according to the first set of blast parameters.

20 Claims, 6 Drawing Sheets

(51) Int. Cl.
*B24C 1/08* (2006.01)
*B24C 3/06* (2006.01)
*G06T 7/00* (2017.01)
*G06T 17/00* (2006.01)
*G06V 10/40* (2022.01)

(52) U.S. Cl.
CPC .............. *G06T 7/001* (2013.01); *G06T 17/00* (2013.01); *G06V 10/40* (2022.01); *G06T 2200/24* (2013.01); *G06T 2207/30164* (2013.01); *G06V 2201/06* (2022.01)

(58) Field of Classification Search
CPC .. B24C 1/04; B24C 1/06; B24C 1/086; B24C 3/06; B24C 7/0053; B24C 7/0015; B24C 7/0061; B24C 7/0023; B24B 49/12; B24B 49/14
USPC .......................... 451/2, 3, 5, 6, 7, 11, 38, 75
See application file for complete search history.

(56) References Cited

U.S. PATENT DOCUMENTS

| | | | |
|---|---|---|---|
| 2019/0012777 A1* | 1/2019 | Crannell | G06T 7/13 |
| 2020/0094374 A1* | 3/2020 | Beaucamp | B24B 13/012 |
| 2022/0032461 A1* | 2/2022 | Gupta | B25J 9/1653 |
| 2022/0164938 A1* | 5/2022 | Shiki | G06V 10/96 |
| 2022/0347843 A1* | 11/2022 | Ahire | B25J 9/1653 |
| 2023/0016208 A1* | 1/2023 | Kameda | C21D 7/06 |
| 2023/0249316 A1* | 8/2023 | Blair | B24C 7/0053 |
| | | | 451/5 |

\* cited by examiner

SYSTEM AND METHOD FOR MEDIA BLASTING A WORKPIECE

CROSS-REFERENCE TO RELATED APPLICATIONS

This Application is related to U.S. Non-Provisional application Ser. No. 18/111,470, filed on 17 Feb. 2023, which is hereby incorporated in its entirety by this reference.

TECHNICAL FIELD

This invention relates generally to the field of media blasting and more specifically to a new and useful system and method for autonomously media blasting a workpiece in the field of media blasting.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
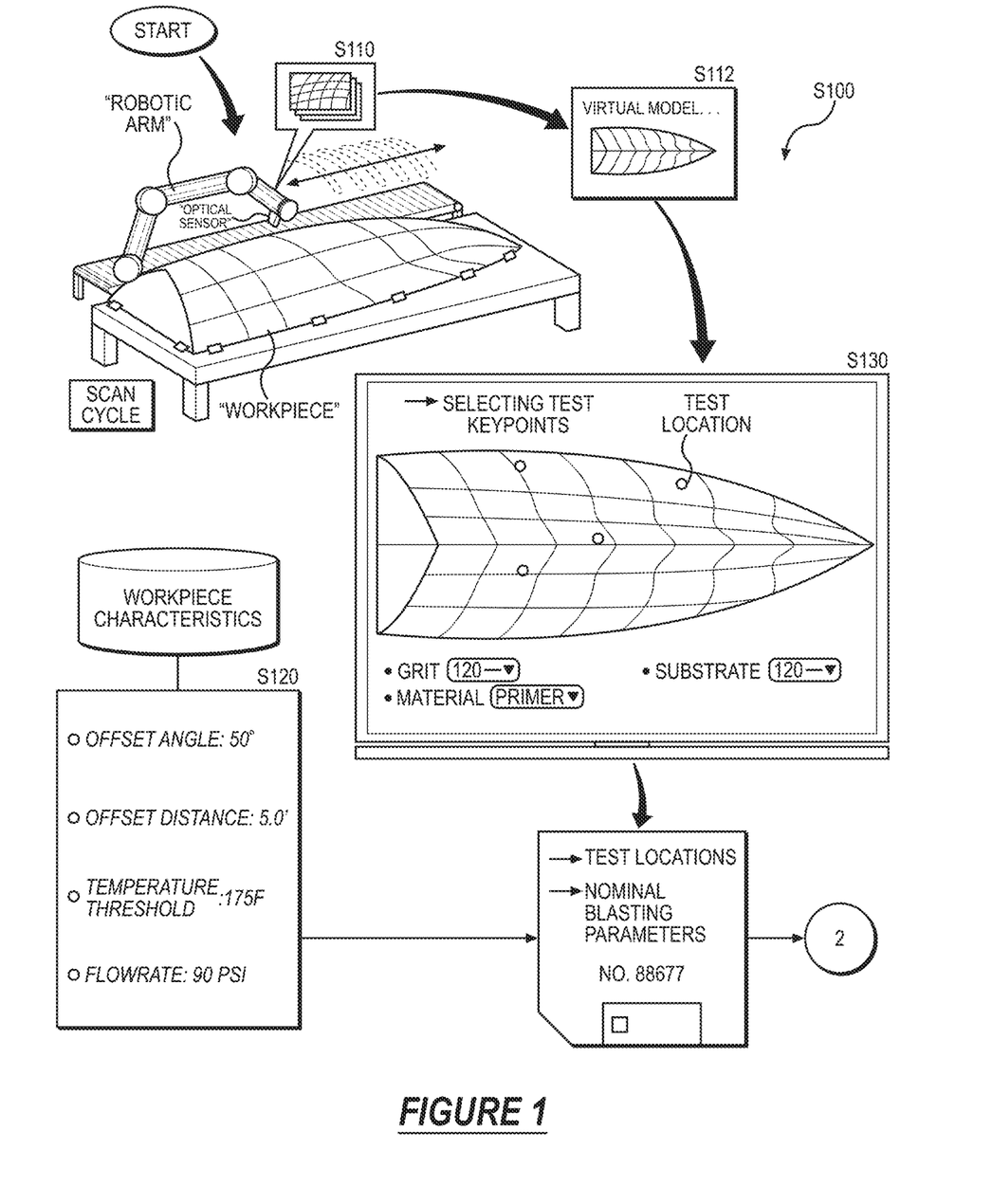
FIG. 1 is a flowchart representation of a method.
Figure 2:
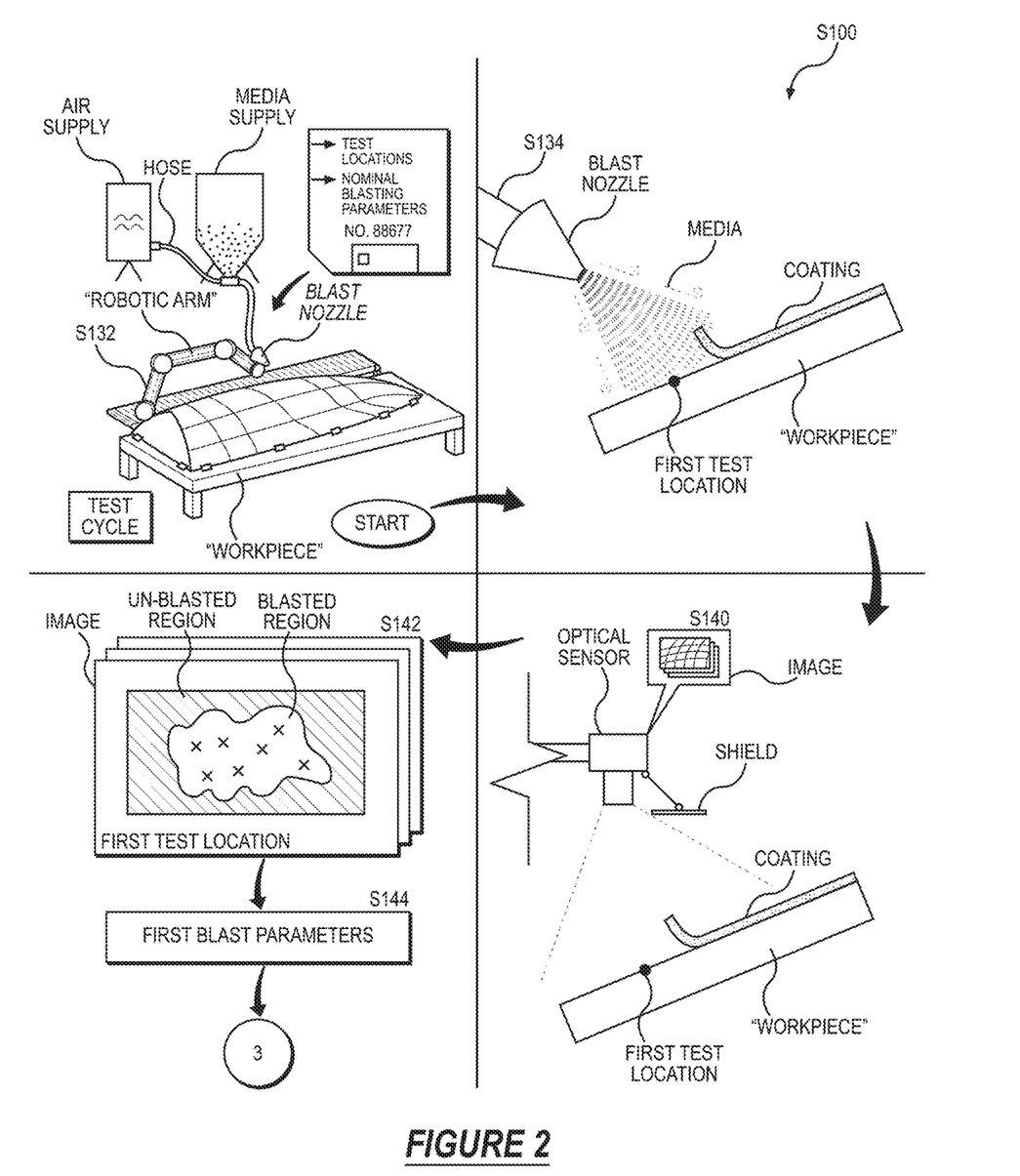
FIG. 2 is a flowchart representation of the method.

As shown in FIGS. 1 and 2, a method S100 for media blasting a workpiece includes, during a scan cycle: accessing a first set of images captured by an optical sensor traversing a scan path over the workpiece in Block S110; and compiling the first set of images into a virtual model of the workpiece in Block S112.

The method S100 further includes, during a first test cycle: accessing a nominal set of blast parameters in Block S120; receiving selection of a first test location on the virtual model representing the workpiece in Block S130; via a set of actuators, navigating a blast nozzle proximal the first test location on the workpiece in Block S132; and projecting blasting media toward the workpiece at the first test location according to the nominal set of blast parameters in Block S134.

The method S100 also includes, during the first test cycle: accessing a first image from the optical sensor defining a field of view intersecting the first test location on the workpiece in Block S140; detecting a first scope of coating (e.g., paint, rust) removal from the first test location on the workpiece based on the first image in Block S142; and setting a first set of blast parameters based on the nominal set of blast parameters and the first scope of coating removal in Block S144.

The method S100 further includes generating a first tool path for a first workpiece region of the workpiece based on a geometry of the workpiece represented in the virtual model and the first set of blast parameters in Block S150.

The method S100 also includes, during a processing cycle: via the set of actuators, navigating the blast nozzle over the first workpiece region according to the first tool path in Block S160; and projecting blasting media toward the workpiece according to the first set of blast parameters in Block S162.

1.1 Variation: Blast Parameter Interpolation

Figure 3:
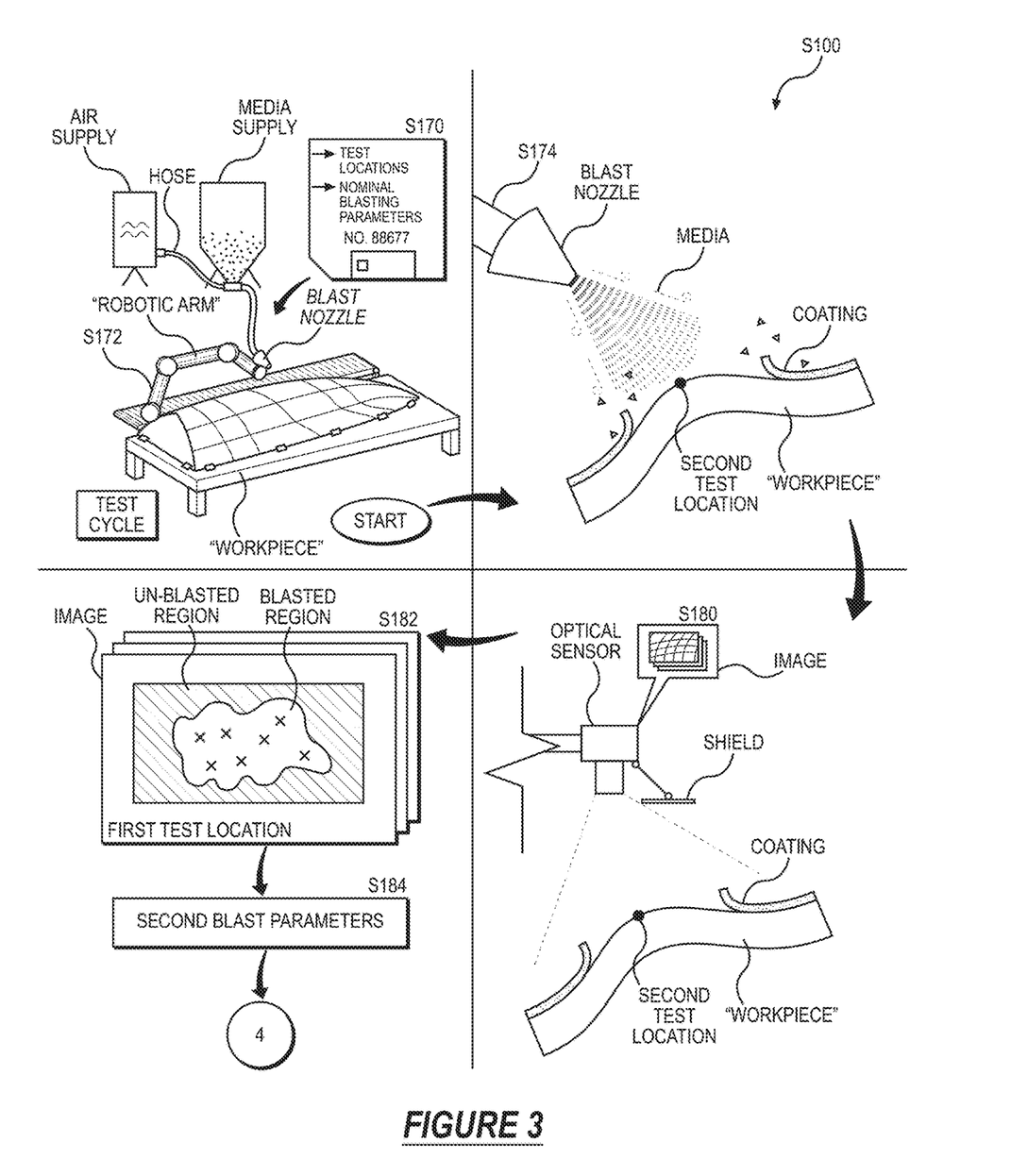
FIG. 3 is a flowchart representation of the method.
Figure 4:
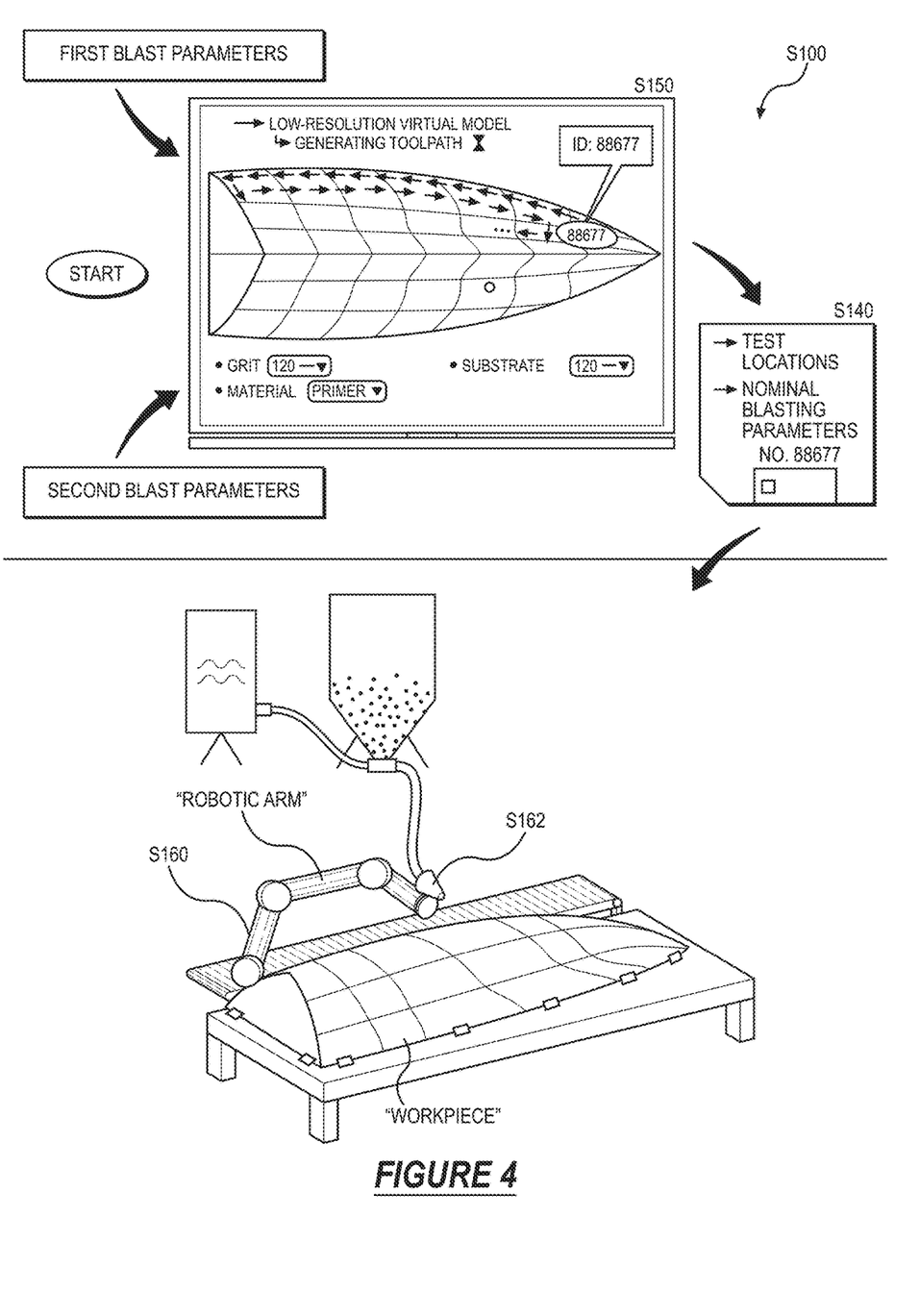
FIG. 4 is a flowchart representation of the method.
Figure 5:
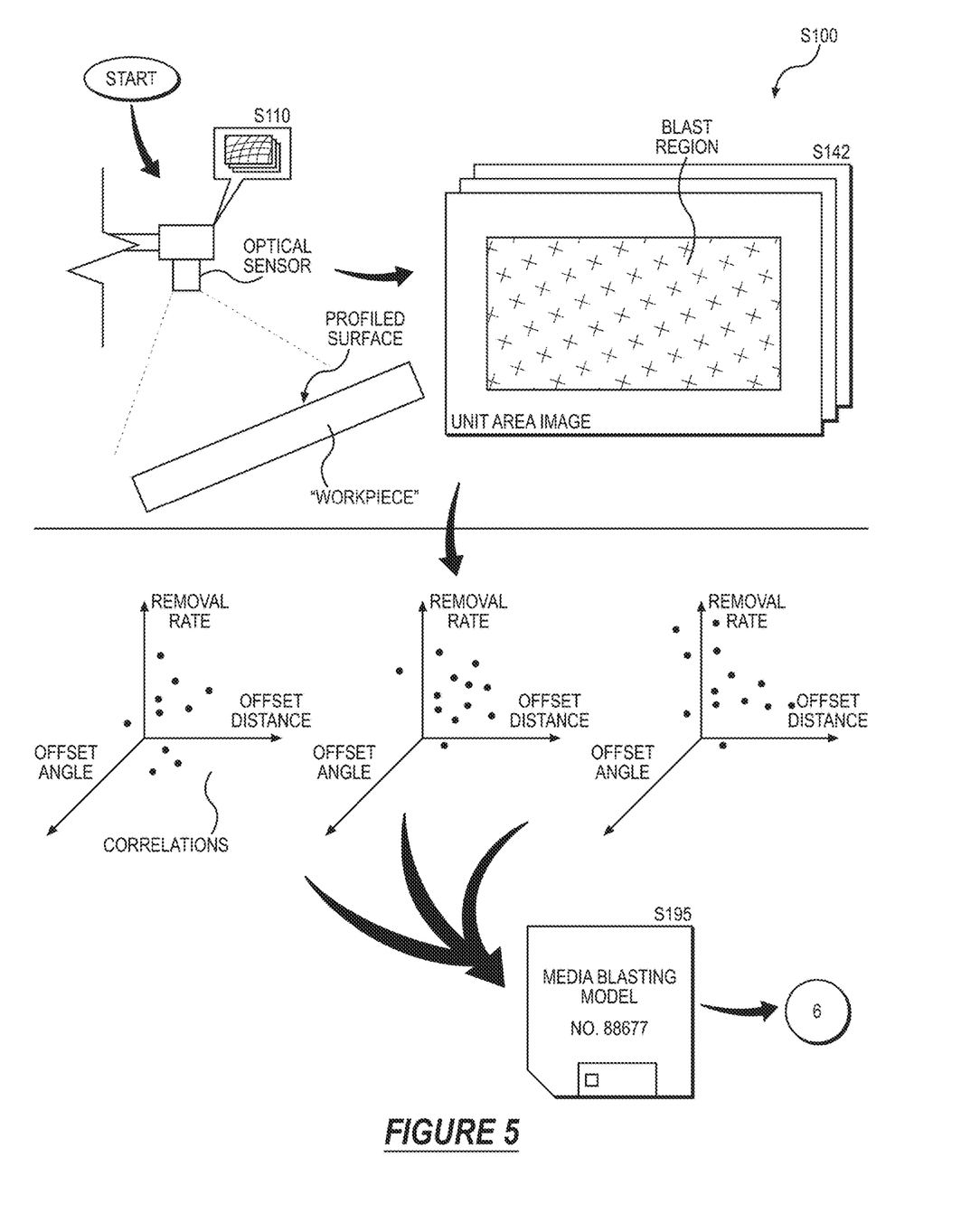
FIG. 5 is a flowchart representation of the method.
Figure 6:
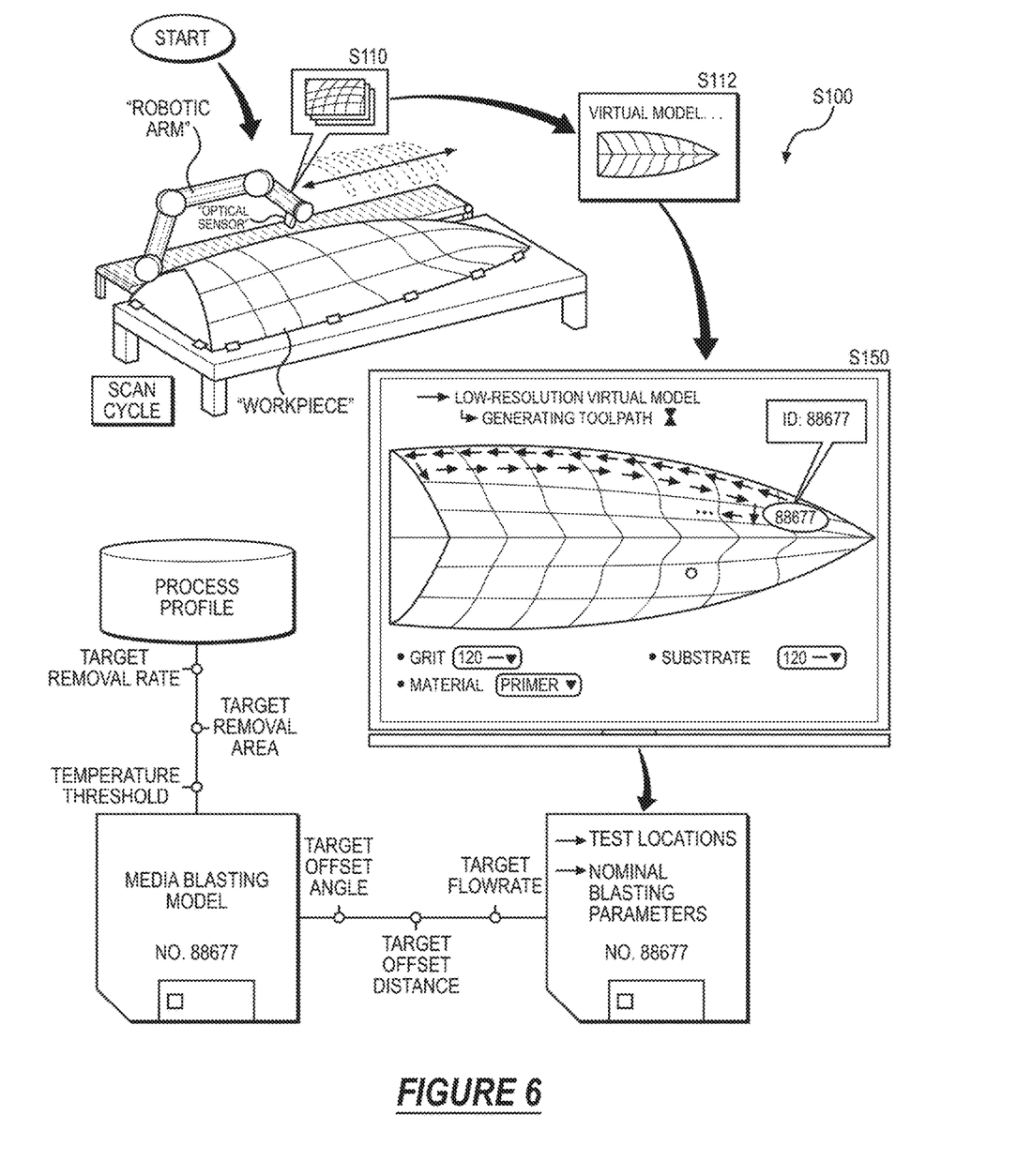
FIG. 6 is a flowchart representation of the method.

In one variation, as shown in FIGS. 1, 2, and 3, the method S100 further includes, during the first test cycle: receiving selection of a second test location on the virtual model representing the workpiece in Block S170; via the set of actuators, navigating the blast nozzle proximal the second test location on the workpiece in Block S172; and projecting blasting media toward the workpiece at the second test location according to the nominal set of blast parameters in Block S174.

This variation of the method S100 also includes, during the first test cycle: accessing a second image from the optical sensor defining a field of view intersecting the second test location on the workpiece in Block S180; detecting a first scope of coating removal from the second test location on the workpiece based on the second image in Block S182; and setting a second set of blast parameters based on the nominal set of blast parameters and the second scope of coating removal in Block S184.

This variation of the method S100 further includes, based on the first set of blast parameters and the second set of blast parameters, interpolating blast parameters from the first test location to the second test location to generate a set of interpolated blast parameters in Block S190.

This variation of the method S100 includes generating the first tool path based on the geometry of the workpiece represented in the virtual model and the set of interpolated blast parameters in Block S150.

2. Applications

Generally, an autonomous scanning and media blasting system (hereinafter the "system") can execute Blocks of the method S100 to: autonomously navigate a blast nozzle-over and offset a workpiece loaded at a work zone proximal the system-along a predefined toolpath defining a sequence of nominal positions and orientations traversable by the blast nozzle over the workpiece during a media blasting process; and project blasting media (e.g., sand, walnut shells, corn cob blast media, air ball tumbling media, aluminum oxide) from the blast nozzle toward the workpiece according to predefined blast parameters (e.g., offset distance, offset angle, feed rate, stepover distance) along the tool path over the workpiece. Thus, rather than adjusting blast parameters according to real-time data retrieved during a blasting process, the system can navigate the blast nozzle over the workpiece according to the predefined tool path and the predefined blast parameters to achieve a target scope of coating removal across a region or the entire workpiece.

More specifically, during a pre-blasting process, the system can: autonomously capture scan data of a workpiece occupying a work cell during a rapid, contactless scan cycle; compile the scan data into a virtual three-dimensional model representing the workpiece; and receive selection from an operator of a test location in the virtual three-dimensional model, such as based on a geometry (e.g., concave, convex, planar) of a workpiece region on the workpiece represented in the virtual model. Accordingly, the system can then: access a set of nominal blast parameters (e.g., offset distance, feed rate), such as based on substrate characteristics (e.g., sheet metal) and coating characteristics (e.g., rust, paint) of the workpiece; via a set of actuators (e.g., robotic arm, conveyer), navigate the blast nozzle proximal the test location over the workpiece; and project blasting media from the blast nozzle toward the first test location on the workpiece according to the nominal blast parameters.

The system can then: pause projecting of the blasting media for a target duration of time (e.g., 20 seconds) to allow debris (e.g., blast media, dust, removed coating) to settle at the work zone; capture a first image from an optical sensor defining a field of view intersecting the first test location; and implement computer vision techniques (e.g., template matching) to derive a scope of coating removal about the first test location on the workpiece. Furthermore, the system can: identify the scope of coating removal as exceeding a threshold deviation from a target scope of coating removal; adjust the nominal blast parameters to increase or decrease energy input per unit area on the workpiece to achieve the target scope of coating removal; and store the adjusted nominal blast parameters as a first set of blast parameters for the workpiece. In one example, the nominal blast parameters correspond to predefined low energy blast parameters in order to prevent damage to the workpiece during the initial test cycle. The system can then, based on the scope of coating removal at the workpiece according to the predefined low energy blast parameters, adjust the nominal blast parameters to increase energy input applied to the workpiece.

Accordingly, the system can then generate the tool path corresponding to a workpiece region of the workpiece-containing the first test location-based on a geometry of the workpiece represented in the virtual model and the first set of blast parameters. The system can then initialize the blasting process to: navigate the blast nozzle over the workpiece according to the tool path; and project blasting media from the blast nozzle toward the workpiece—along the tool path—to remove the coating across the substrate of the workpiece according to the target scope of coating removal.

Additionally, the system can: repeat the pre-blasting process described above across a set of test locations of the workpiece; and interpolate blast parameters—in a set of interpolated blast parameters—across the set of test locations based on the nominal blast parameters and a scope of coating removal for each test location in the set of test locations. Accordingly, the system can then generate the tool path corresponding to a workpiece region of the workpiece—containing the first test location—based on a geometry of the workpiece represented in the virtual model and the set of interpolated blast parameters.

Therefore, rather than adjusting blast parameters according to real-time data during a blasting process, the system can execute a blasting media process according to a predefined tool path and predefined blast parameters assigned to each unit area of the workpiece in order to achieve a target scope of coating removal across a region of the entire workpiece.

3. System

In one implementation, as shown in FIG. 1, the system includes: a robotic arm arranged in or adjacent a work zone and that includes a set of articulatable joints interposed between a series of arm segments; an end effector supported on a distal end of the robotic arm; and a blast nozzle (e.g., nozzle gun, straight bore nozzle, venturi type nozzle) arranged on or integrated into the end effector. The system also includes: an air supply (e.g., compressed air tank, electric air compressor) coupled (e.g., via a hose) to the blast nozzle and configured to supply pressurized air through the blast nozzle; a media supply (e.g., a funnel media cabinet) containing blast media (e.g., sand, walnut shells, corn cob blast media, air ball tumbling media, aluminum oxide) and coupled (e.g., via a hose) to the air compressor and the blast nozzle; and an optical sensor (e.g., a set of depth sensors, a color camera, a thermal camera) arranged on or integrated into the end effector and configured to captured optical images (e.g., depth maps, thermal images, photographic color images) of a workpiece. The system can further include: a set of position sensors configured to output signals representing (or assemblable into) a three-dimensional position of the end effector; a display configured to render a user interface accessible by an operator; and a controller configured to execute Blocks of the method S100.

Additionally, the system can include a temperature sensor, such as a contactless temperature sensor (e.g., thermal vision camera, laser temperature probe) arranged on the robotic arm and/or a contact temperature sensor (e.g., temperature probe), configured to couple the workpiece and output temperature values (e.g., timeseries of temperature values) corresponding to temperatures at the workpiece.

During a blasting cycle, debris-such as blasting media projected from the blasting nozzle, removed coating from the workpiece, and dust-occupies the work zone and affects (e.g., damages) the suite of sensors (e.g., temperature sensor, optical sensor) on the system proximal the work zone. Accordingly, the system can include a shield (e.g., retractable door): arranged over the suite of sensors (e.g., temperature sensor, optical sensor); and coupled to an actuator in order to set the shield in an open configuration during a scan cycle or review cycle and in a closed configuration during a processing cycle.

In this implementation, the system can also include a conveyer, track, or rail configured to traverse the robotic arm longitudinally along the work zone, such as to reach and process an elongated part defining a high length-to-width ratio (e.g., a high aspect ratio), such as a boat hull or aircraft wing. In one example, the system can execute Blocks of the method S100 to: via a set of actuators (i.e., the robotic arm, the conveyer), navigate the end effector- and therefore the blast nozzle and the optical sensor-along a path (e.g., scan path, toolpath) over and offset (e.g., angularly offset, linearly offset) above the workpiece; track a sequence of positions by deriving three-dimensional positions of a reference point on the blast nozzle based on one-dimensional positions of the set of actuators while traversing the end effector across the workpiece; and trigger the air compressor to supply pressurized air (e.g., 100 PSI) through the blast nozzle and thus direct (e.g., siphon) media contained within the media cabinet through the blast nozzle and toward the workpiece.

In another implementation, the system includes a multi-axis (e.g., five-axis) gantry configured to locate and articulate the end effector, blast nozzle, and optical sensor(s) across the work zone.

In another implementation, the system can include a proximity sensor (e.g., ultrasonic proximity sensor, laser proximity sensor) arranged on or integrated into the end effector. The system can thus: read a set of electrical values from the proximity sensor; interpret an offset distance between the end effector and the workpiece during a media blasting process; and, in response to the offset distance exceeding a threshold offset distance (e.g., one meter) pause the media blasting process for review by an operator. The operator can then inspect the workpiece to ensure the workpiece is securely loaded onto a support rig before resuming the media blasting process.

In yet another implementation, the system can include an acoustic sensor (e.g., microphone, piezoelectric sensor, seismic sensors) arranged on or integrated into the blast nozzle. The system can thus: during a media blasting process, read a set of electrical values from the acoustic sensor representing flow rate of media through the blast nozzle during the media blasting process; at a first time, during the media blasting process, interpret a first flow rate of media through the blast nozzle; and, in response to the first flow rate falling below a target flow rate (e.g., 100 PSI), pause the media blasting process for review by an operator. In particular, the system can: generate a prompt requesting a user to inspect the blast nozzle in order to confirm an operating condition of the blast nozzle; and serve the prompt to an operator device associated with the operator.

4. Workpiece Loading+Nominal Blasting Parameters

Block S120 of the method S100 recites accessing a nominal set of blast parameters. Generally, the system can autonomously retrieve blast parameters and/or other processing limits for autonomously blasting media toward the workpiece.

In particular, in preparation for autonomously processing (e.g., blasting media) a workpiece by the system, an operator locates the workpiece in the work zone adjacent the system. For example, the operator can: load the workpiece onto a support rig (e.g., a wheeled table) and install intermittent clamps on the workpiece to retain the workpiece on the support rig; place the support rig and workpiece into the work zone; and lock wheels of the support rig to maintain the support rig—and therefore the workpiece—within the work zone.

The system can then: generate a prompt requesting that a user input nominal blast parameters for blasting media toward the workpiece; and serve the prompt, such as to an operator device associated with the operator overseeing the processing cycle. The operator device can then: receive the nominal blast parameters at the operator device; and transmit the nominal blast parameters to the controller of the system. In one example, the nominal blast parameters can include: a nominal feed rate for navigating the blast nozzle over the workpiece; a nominal stepover distance over the workpiece; a nominal offset angle between an axis of the blast nozzle and a normal vector per unit area on the workpiece; a nominal offset distance between the blast nozzle and the workpiece; and a nominal pressure for projecting blast media toward the workpiece from the blast nozzle (e.g., a maximum force applied by a media cloud output from the blast nozzle to a region of the workpiece). Additionally, the operator can supply these processing limits based on known strengths and compliance characteristics (e.g., substrate characteristics, coating characteristics) of the workpiece.

Additionally or alternatively, the system can retrieve these nominal blast parameters from a predefined processing profile, such as corresponding to a workpiece type (e.g., a boat hull, an aircraft wing), substrate characteristics (e.g., metal thickness, metal type), coating characteristics (e.g., rust, paint), of the workpiece at the work zone. For example, the system can select a predefined processing profile in a processing profile database based on: a material of the workpiece (e.g., fiberglass, steel, aluminum) and/or a nominal wall thickness of the workpiece selected by the operator; or a length, aspect ratio, and/or a geometry profile of the workpiece (e.g., concave with high aspect ratio, convex with high aspect ratio, concave with low aspect ratio, convex with low aspect ratio) entered by the operator or derived from a scan of the workpiece completed by the system. The system can then load processing limits extracted from the processing profile.

5. Part Scan

Blocks S110 and S112 of the method S100 recite: accessing a first set of images captured by an optical sensor traversing a scan path over the workpiece; and compiling the first set of images into a virtual model of the workpiece. Generally, in Blocks S110 and S112, the system can implement methods and techniques described in U.S. patent application Ser. No. 18/111,470 to: autonomously navigate the optical sensor (e.g., depth sensor, thermal camera, color camera) over the workpiece; capture optical images (e.g., depth maps, thermal images, photographic color images) of the workpiece; and implement three-dimensional modeling techniques to assemble the optical images into a virtual three-dimensional model that represents surfaces of the workpiece within a wide dimensional tolerance (e.g., +/−0.15).

For example, after the operator loads the workpiece into the work zone and confirms processing limits for the workpiece, the system can initiate a scan cycle. During the scan cycle, the system can: navigate the optical sensor-located on the end effector-along the scan path over and offset above the workpiece; monitor a distance between the end effector and the workpiece based on depth data collected by the optical sensor; and implement closed-loop controls to maintain a target offset distance between the optical sensor and the workpiece (e.g., 20", 50 centimeters). In this example, for a workpiece defining an elongated geometry including a long axis located approximately parallel a longitudinal axis of the work zone, the system can actuate a conveyor supporting the robotic arm to traverse the robotic arm along the longitudinal axis of the work zone while rastering the end effector and the optical sensor laterally across the work zone to capture a sequence of optical images representing all surfaces of the workpiece accessible by a blast nozzle on the end effector.

The system can thus capture scan data—such as color photographic images, stereoscopic images, depth maps, and/or LIDAR images—from a set of optical sensors arranged on the end effector while traversing the end effector across (e.g., over and not in contact with) the workpiece. For example, the system can capture depth maps at a rate of 2 Hz while traversing the end effector across the workpiece at a rate of three feet per second at a target offset distance of three feet between the end effector and the workpiece, which corresponds to a nominal sensor field of view of three feet by three feet and thus yields approximately 50% overlap between consecutive depth maps captured by the system during the scan cycle.

The system then compiles these optical images into a virtual three-dimensional model of the workpiece as described in U.S. patent application Ser. No. 18/111,470, such as by implementing structure-from-motion techniques or by fusing these optical images into the virtual model based on poses of the robotic arm when these optical images were captured. For example, the system can compile this set of optical images into a three-dimensional mesh within a virtual three-dimensional space.

6. Test Cycle

Blocks S130, S132, and S134 of the method S100 recite: receiving selection of a first test location on the virtual model representing the workpiece; via a set of actuators, navigating a blast nozzle proximal the first test location on the workpiece; and projecting blasting media toward the workpiece at the first test location according to the nominal set of blast parameters. Additionally, Blocks S140, S142, and S144 of the method S100 recite: accessing a first image from the optical sensor defining a field of view intersecting the first test location on the workpiece; detecting a first scope of coating removal from the first test location on the workpiece based on the first image; and setting a first set of blast parameters based on the nominal set of blast parameters and the first scope of coating removal.

Generally, the system can: autonomously project blasting media toward a test location on the workpiece according to nominal blast parameters; characterize a scope of coating removal at the test location; and, based on the nominal blast parameters and the scope of coating removal, derive target blast parameters to achieve a target scope of coating removal proximal the test location on the workpiece. More specifically, the system can: pause the processing cycle for a target duration of time (e.g., 20 seconds) to allow debris (e.g., blast media, dust, removed coating) to settle at the work zone; access an image from an optical sensor defining a field of view intersecting the test location; implement computer vision techniques (e.g., template matching, object recognition) to characterize the scope of coating removal at the first location; and, based on the scope of coating removal, adjust the nominal blast parameters (e.g., offset distance, feed rate) to increase or decrease energy input per unit area on the workpiece. The system can then repeat this process for a series of test locations across the workpiece and interpolate blast parameters across the series of test locations during execution of a processing cycle.

6.1 Selecting Test Locations

In one implementation, the system can: generate a prompt requesting an operator to select a test location in the virtual model representing the workpiece; and serve the prompt and the virtual model to the operator device associated with the operator. Accordingly, the operator device can then: render the virtual model at the operator device, such as at an integrated display at the operator device; receive selection of the test location on the virtual model at the operator; and transmit the test location or multiple test locations to the system to in order to execute a test cycle.

In one example, the operator device can: receive selection of a first test location characterized by a first radius in the virtual model from the operator; receive selection of a second test location characterized by a second radius, less than the first radius, in the virtual model from the operator; and transmit the first test location and the second test location to the system in order to execute the test cycle. The system can then: via the set of actuators, navigate the blast nozzle proximal the test location on the workpiece; and project blasting media from the blast nozzle toward the test location on the workpiece to remove coating over a substrate of the workpiece at the test location. Accordingly, the system can then repeat this process for multiple test locations selected by the operator prior to the processing cycle.

In another implementation, the system can autonomously select a set of test locations for the test cycle, such as based on the geometry of the virtual model representing the workpiece and/or coating quality characteristics (e.g., flaking, glossiness, rust bleed-through) across the workpiece.

In one example, the system can: identify a first test location in the virtual model characterized by a concave geometry; and identify a second test location in the virtual model characterized by a convex geometry. Accordingly, the system can then: navigate the blast nozzle proximal the first test location on the workpiece; project blasting media from the blast nozzle toward the workpiece to remove coating across the workpiece at the first test location; pause projection of the blasting media for a target duration of time (e.g., 20 seconds) to allow debris (e.g., blast media, dust, removed coating) to settle at the work zone; navigate the blast nozzle proximal the second test location on the workpiece; and project blasting media from the blast nozzle toward the workpiece to remove coating across the workpiece at the second test location.

In another example, the system can: retrieve scan data captured by an optical sensor traversing a scan path over the workpiece; implement computer vision techniques (e.g., template matching) to characterize a surface quality (e.g., flaking, glossiness, rust bleed-through) per unit area across the workpiece; identify a first test location on the workpiece characterized by a first surface quality (e.g., glossiness); and identify a second test location on the workpiece characterized by a second surface quality (e.g., flaking) less than the first surface quality. Accordingly, the system can then implement the steps described above to remove coating from the first test location and the second test location on the workpiece.

Therefore, the system can: autonomously select a set of test locations in preparation for a text cycle; and, during the test cycle, sequentially project blasting media across the set of test locations on the workpiece in order to then characterize scope of coating removal on the workpiece according to the nominal blast parameters as described below.

6.2 Scoping Coating Removal

During the test cycle, the system can: navigate the blast nozzle proximal a first test location on the workpiece; project blasting media from the blast nozzle toward the first test location on the workpiece; and pause projection of the blasting media for a target duration of time (e.g., 20 seconds) to allow debris (e.g., blast media, dust, removed coating) to settle at the work zone. The system can then: trigger an actuator to open a shield arranged on the optical sensor; navigate the optical sensor proximal the first test location to define a field of view intersecting the first test location; and capture a first image from the optical sensor depicting the first test location. Accordingly, the system can then implement computer vision techniques (e.g., template matching) to characterize a scope of coating removal about the first test location on the workpiece based on the image captured by the optical sensor.

In one implementation, the system can extract a set of visual features from the image and, based on the set of visual features: detect a blasted region in the first image; and detect an un-blasted region, encircling the blasted region, in the first image. The system can then characterize the scope of coating removal at the first test location based on deviations between the blasted region and the un-blasted region in the first image. In this implementation, based on the deviations, the system can then identify the scope of coating removal as: approximating a target scope of coating removal, such as according to a target surface profile across the workpiece; or falling below a target scope of coating removal. The system can then: adjust the nominal blast parameters (e.g., feed rate, offset distance) to increase or decrease energy input per unit area of the workpiece in order to achieve the target scope of coating removal; and set the adjusted blast parameters as a first set of blast parameters for a subsequent processing cycle to remove the coating from the workpiece.

For example, the system can project blasting media from the blast nozzle toward the workpiece at the first test location according to nominal blast parameters including: a nominal offset distance between the blast nozzle and the workpiece; and a nominal stepover distance across the workpiece. Accordingly, in response to the scope of coating removal at the first test location falling below a target scope of coating removal, the system can then adjust the nominal blast parameters by: decreasing the nominal offset distance to a first offset distance; and decreasing the nominal stepover distance to a first stepover distance. The system can then: store the first offset distance and the first stepover distance in a first set of blast parameters; and assign the first set of blast parameters along a toolpath to remove coating across the workpiece during a processing cycle following the test cycle.

In another example, the system can project blasting media from the blast nozzle toward the workpiece at the first test location according to nominal blast parameters including: a nominal feed rate for navigating the blast nozzle over the workpiece; and a nominal offset angle between an axis of the blast nozzle and a normal vector per unit area on the workpiece. Accordingly, in response to the scope of coating removal at the first test location falling below a target scope of coating removal, the system can then adjust the nominal blast parameters by: decreasing the nominal feed rate to a first feed rate; and decreasing the nominal offset angle to a first offset angle. The system can then: store the first feed rate and the first offset angle in a first set of blast parameters; and assign the first set of blast parameters along a toolpath to remove coating across the workpiece during a processing cycle following the test cycle.

The system can then repeat this process across multiple test locations on the workpiece to derive a set of blast parameters for a subsequent processing cycle to remove the coating from the workpiece.

In another implementation, the system can: extract a set of visual features from the first image depicting the first test location on the workpiece; and detect a blasted region in the first image based on the set of visual features. In this implementation, the system can then: identify a substrate material type (e.g., sheet metal) of the workpiece, such as by receiving selection of the substrate material type from the operator or based on a processing profile corresponding to the workpiece; and retrieve a first template image representing complete blasting (e.g., complete coating removal) of the substrate material type. Accordingly, the system can then characterize the scope of coating removal at the first test location based on deviations between the blasted region in the first image and the template image. As described above, the system can then: based on the scope of coating removal, adjust the nominal blast parameters (e.g., feed rate, offset distance) to increase or decrease energy input per unit area of the workpiece in order to achieve the target scope of coating removal; and set the adjusted blast parameters as a first set of blast parameters for a subsequent processing cycle to remove the coating from the workpiece.

In yet another implementation, the system can: extract a set of visual features from the first image depicting the first test location on the workpiece; and interpret a surface profile for a blasted region in the first image based on the set of visual features. In this implementation, the system can: retrieve a target surface profile corresponding to the workpiece, such as from a processing profile assigned to the workpiece; and characterize the scope of coating removal at the first test location based on deviations between the surface profile for the blasted region and the target surface profile. As described above, the system can then: based on the scope of coating removal, adjust the nominal blast parameters (e.g., feed rate, offset distance) to increase or decrease energy input per unit area of the workpiece in order to achieve the target scope of coating removal; and set the adjusted blast parameters as a first set of blast parameters for a subsequent processing cycle to remove the coating from the workpiece.

Therefore, the system can: autonomously characterize a scope of coating removal across multiple test locations on the workpiece; adjust nominal blast parameters, based on the scope of coating removal across the multiple test locations, to derive blast parameters approximating a target scope of coating removal (e.g., target surface profiling) across the workpiece; and assign these blast parameters to a tool path during a subsequent processing cycle to remove coating from the workpiece.

6.3 Tool Path Generation+Blast Parameter Interpolation

Block S150 of the method S100 recites generating a first tool path for a first workpiece region of the workpiece based on a geometry of the workpiece represented in the virtual model and the first set of blast parameters.

The system can: retrieve a set of blast parameters adjusted from the nominal blast parameters according to a scope of coating removal for a first test location at the workpiece; derive a tool path (e.g., e.g., linear toolpath, serpentine, boustrophedonic) within a first region of the workpiece-containing the first test location-according to the set of blast parameters (e.g., stepover distance); and store the tool path as a set of keypoints across the workpiece represented in the virtual model. Each keypoint, in the set of keypoints: represents a vertex or other point on the toolpath, such as per unit area across the workpiece; defines a three-dimensional position on the workpiece; includes a vector normal to the workpiece at the three-dimensional position; and is labeled with blast parameters (e.g., offset distance, feed rate). More specifically, the system can: project the toolpath onto the workpiece region of the workpiece represented in the virtual model, which represents the workpiece in unloaded form; and extract a three-dimensional position and normal vector of each vertex on the toolpath from the virtual model. Accordingly, the system can then store the toolpath as a first ordered sequence of keypoints: located on an unloaded surface of the workpiece stored in (i.e., represented by) the virtual model; and contained within the workpiece region.

In one implementation, the system can: retrieve a first set of blast parameters adjusted from the nominal blast parameters according to a first scope of coating removal for a first test location at the workpiece; retrieve a second set of blast parameters adjusted from the nominal blast parameters according to a second scope of coating removal for a second test location at the workpiece; and interpolate blast parameters between the first test location and the second test location on the workpiece. Accordingly, the system can then: derive a tool path (e.g., e.g., linear toolpath, serpentine, boustrophedonic) within a first region of the workpiece-containing the first test location and the second test location-according to the interpolated blast parameters (e.g., stepover distance); and store the tool path as a set of keypoints across the workpiece represented in the virtual model.

The system can then repeat this process for each other workpiece region of the workpiece. Thus, during a processing cycle, the system can: retrieve the tool path, such as from the virtual model; navigate the blast nozzle along the tool path; and project blasting media according to the interpolated blast parameters (e.g., per unit area) defined in the tool path.

Alternatively, the system can implement the foregoing methods and techniques to generate a single continuous toolpath spanning the entire workpiece or an entire surface of the workpiece selected for autonomous processing by the system.

Therefore, rather than adjusting blast parameters according to real-time data during a blasting media process, the system can execute a blasting media process according to a predefined tool path and predefined blast parameters in order to achieve a target scope of coating removal across the workpiece.

6.4 Temperature Monitoring

In one implementation, the system can: retrieve a temperature threshold (e.g., 350 degrees fahrenheit), such as from a processing profile corresponding to the workpiece or based on a substrate material type for the workpiece; read a temperature value from a temperature sensor (e.g., probe, thermal camera, laser temperatures sensor) coupled to the first test location on the workpiece; and, in response to the temperature value approaching (e.g., within 10 degrees fahrenheit) the temperature threshold, adjust the nominal blast parameters to decrease energy input per unit area of the workpiece in order to prevent damage (e.g., warping, deflection) to the substrate of the workpiece during the blasting media process.

In one example, during the test cycle, the system can: terminate projection of blasting media toward the workpiece at the first test location; access a threshold temperature value (e.g., 350 degrees fahrenheit) corresponding to a substrate material type (e.g., aluminum sheet metal) of the workpiece; read a temperature value from a contactless temperature sensor (e.g., laser temperature sensor) intersecting the first test location on the workpiece; and, in response to the temperature value exceeding the threshold temperature value, adjust the first set of blast parameters (e.g., offset distance, pressure) by decreasing energy input per unit area of the workpiece.

In another example, during the test cycle, the system can: retrieve a threshold temperature value (e.g., 350 degrees fahrenheit) corresponding to a substrate material type (e.g., aluminum sheet metal) of the workpiece; generate a prompt to locate a temperature sensor (e.g., temperature probe) on a rear side of the workpiece adjacent the first test location; and serve the prompt to an operator device associated with an operator overseeing a blasting process of the workpiece. Accordingly, during a first time period while blasting media toward the workpiece at the first test location, the system can: read a timeseries of temperature values from the temperature sensor; and, in response to the timeseries of temperature values approaching the threshold temperature value, deviate the nominal set of blast parameters (e.g., offset distance, pressure) to decrease energy input to the first test location.

Therefore, the system can adjust the nominal blast parameters to maintain the workpiece below a target temperature threshold (e.g., 350 degrees fahrenheit) in order to prevent damage (e.g., warping, deflection) to the workpiece during the processing cycle.

7. Processing Cycle

Blocks S160 and S162 of the method S100 recite: via the set of actuators, navigating the blast nozzle over the first workpiece region according to the first tool path; and projecting blasting media toward the workpiece according to the first set of blast parameters. Generally, the system can: autonomously navigate the blast nozzle along a tool path (e.g., sequence of keypoints) defined within a workpiece region of the workpiece; and project blasting media from the blast nozzle toward the workpiece according to blast parameters specified in the tool path without reliance on real-time data during the processing cycle. More specifically, the system can, for each unit area across the workpiece along the tool path: retrieve a set of blast parameters from the virtual model for the unit area; and project blast media from the blast nozzle to the unit area according to the set of blast parameters for the unit area.

In one implementation, the system can implement closed-loop controls to project blasting media according to the set of blast parameters set in the tool path while the blast nozzle traverses over the workpiece. For example, for a first keypoint in a first ordered sequence of keypoints, the system can drive the set of actuators to: locate the blast nozzle at a first three-dimensional position intersecting the first keypoint; align an axis of the blast nozzle to the target offset angle from a first vector contained in the first keypoint; and align an outlet of the blast nozzle to the target offset distance from the first keypoint. The system can then drive the set of actuators to interpolate a three-dimensional path and blast nozzle orientation from the first keypoint to a second keypoint—in the first ordered sequence of keypoints—while implementing closed-loop controls to maintain the blast nozzle from the workpiece at the target offset angle and the target offset distance. The system can repeat this process for each other keypoint along the toolpath and then along subsequent toolpaths defined for other workpiece regions of the workpiece.

Therefore, rather than adjusting blast parameters according to real-time data retrieved during the processing cycle, the system can adjust blast parameters according to predefined blast parameters per unit area across the workpiece. The system can then repeat this process for multiple tool paths corresponding to workpiece regions across the entire workpiece in order to completely remove coating (e.g., paint, rust) from a substrate of the workpiece.

7.1 Review+Blasting Model

Blocks of the method S100 further recite, based on a set of correlations, generating a blasting model representing combinations of blast parameters characteristic of coating removal from the workpiece in Block S195.

In one implementation, the system can: initiate a review cycle following the processing cycle (i.e., following settling of debris from the processing cycle); derive correlations between blast parameters during the processing cycle, geometry of the workpiece, and a scope of coating removal across the workpiece following the processing cycle; and implement artificial intelligence, machine learning, regression, statistical analysis and/or other methods and techniques to derive a blasting model-based on the correlations-representing combinations of blast parameters characteristic of coating removal from the workpiece. Thus, prior to initiating a second processing cycle for a second workpiece, the system can: retrieve scan data (e.g., images) to generate a second virtual model representing the second workpiece; derive blast parameters for each unit area of the workpiece represented in the virtual model based on the blasting model; and generate the tool path—skipping the test cycle—for a workpiece region on the workpiece based on a geometry of the second virtual model representing the workpiece and the blast parameters.

Accordingly, the system can then initiate the second processing cycle to: navigate the blast nozzle over the second workpiece according to the tool path; and project blasting media from the blast nozzle toward the workpiece along the tool path according to the blasting model.

In one example, during the processing cycle, the system can record a set of blast parameters for each unit area of the workpiece along the tool path. Following termination of the processing cycle, the system can then navigate the optical sensor along the tool path—traversed during the processing cycle—to capture a series of images representing each unit area on the workpiece after the processing cycle. Furthermore, for each unit area of the workpiece, the system can: characterize a scope of coating removal (e.g., surface profile) based on an image, in the series of images, corresponding to the unit area; and derive a correlation, in a set of correlations, between the set of blast parameters (e.g., offset distance, pressure) implemented over the unit area, a geometry (e.g., concave, convex) of the unit area represented in the virtual model, and the scope of coating removal from the unit area. The system can then, based on the set of correlations, generate a blasting model representing combinations of blast parameters characteristic of coating removal from the workpiece.

In this example, the system can then, during a second scan cycle: access a second set of images captured by the optical sensor traversing the scan path over a second workpiece; and compile the second set of images into a second virtual model of the second workpiece. The system can then, for each unit area of the second workpiece represented in the second virtual model, assign blast parameters—in a second set of blast parameters—to the unit area based on: the blasting model; and a geometry per the unit area represented in the second virtual model. Accordingly, the system can then generate a second tool path based on the geometry of the second workpiece represented in the second virtual model and the second set of blast parameters. Thus, during a second processing cycle following the second scan cycle, the system can: via the set of actuators, navigate the blast nozzle over the second workpiece region according to the second tool path; and project blasting media toward the second workpiece according to the second set of blast parameters.

Therefore, the system can: receive loading of a workpiece on the work zone; initiate a scan cycle to derive a tool path for blasting media toward the workpiece based on the blasting model and a virtual model of the workpiece; and initiate a processing cycle to navigate the blast nozzle over the workpiece according to the tool path to remove coating from the workpiece.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for media blasting a workpiece comprising:
during a scan cycle:
   accessing a first set of images captured by an optical sensor traversing a scan path over the workpiece; and
   compiling the first set of images into a virtual model of the workpiece;
during a test cycle:
   accessing a nominal set of blast parameters;
   based on the virtual model, receiving a selection of a first test location on the the workpiece;
   via a set of actuators, navigating a blast nozzle proximal the first test location on the workpiece;
   dispensing blast media toward the workpiece at the first test location according to the nominal set of blast parameters;
   accessing a first image from the optical sensor defining a field of view intersecting the first test location on the workpiece;
   detecting a first scope of coating removal from the first test location on the workpiece based on the first image;
   setting a first set of blast parameters based on the nominal set of blast parameters and the first scope of coating removal;
   based on the virtual model, receiving a selection of a second test location on the workpiece;
   via the set of actuators, navigating the blast nozzle proximal the second test location on the workpiece;
   dispensing blast media toward the workpiece at the second test location according to the nominal set of blast parameters;
   accessing a second image from the optical sensor defining a field of view intersecting the second test location on the workpiece;
   detecting a second scope of coating removal from the second test location on the workpiece based on the second image;
   setting a second set of blast parameters based on the nominal set of blast parameters and the second scope of coating removal;
   based on the first set of blast parameters and the second set of blast parameters, interpolating blast parameters from the first test location to the second test location to generate a set of interpolated blast parameters; and
   generating a first tool path for a first workpiece region of the workpiece based on a geometry of the workpiece represented in the virtual model and the set of interpolated blast parameters; and
during a processing cycle:
   via the set of actuators, navigating the blast nozzle over the first workpiece region according to the first tool path; and
   dispensing blast media toward the workpiece according to the set of interpolated blast parameters.

2. The method of claim 1:
wherein receiving selection of the first test location comprises receiving selection of the first test location characterized by a first radius in the virtual model representing the workpiece;
wherein setting the first set of blast parameters comprises setting the first set of blast parameters based on the nominal set of blast parameters, the first scope of coating removal, and the first radius;
wherein receiving selection of the second test location comprises receiving selection of the second test location characterized by a second radius, less than the first radius, in the virtual model representing the workpiece; and wherein setting the second set of blast parameters comprises setting the second set of blast parameters based on the nominal set of blast parameters, the second scope of coating removal, and the second radius.

3. The method of claim 1:
wherein receiving selection of the first test location comprises receiving selection of the first test location characterized by a concave geometry in the virtual model representing the workpiece;
wherein setting the first set of blast parameters comprises setting the first set of blast parameters based on the nominal set of blast parameters, the first scope of coating removal, and the concave geometry;
wherein receiving selection of the second test location comprises receiving selection of the second test location characterized by a convex geometry in the virtual model representing the workpiece; and
wherein setting the second set of blast parameters comprises setting the second set of blast parameters based on the nominal set of blast parameters, the second scope of coating removal, and the convex geometry.

4. The method of claim 1:
wherein receiving selection of the first test location comprises receiving selection of the first test location characterized by a first coating quality;
wherein setting the first set of blast parameters comprises setting the first set of blast parameters based on the nominal set of blast parameters, the first scope of coating removal, and the first coating quality;
wherein receiving selection of the second test location comprises receiving selection of the second test location characterized by a second coating quality less than the first coating quality; and
wherein setting the second set of blast parameters comprises setting the second set of blast parameters based on the nominal set of blast parameters, the second scope of coating removal, and the second coating quality.

5. The method of claim 1:
wherein accessing the first image comprises:
terminating projection dispensing of blast media toward the workpiece at the first test location;
triggering an actuator to open a shield arranged on the optical sensor; and
capturing the first image at the optical sensor defining the field of view intersecting the first test location at the workpiece;
wherein detecting the first scope of coating removal comprises:
extracting a first set of visual features from the first image;
based on the first set of visual features:
detecting a blasted region in the first image; and
detecting an un-blasted region, adjacent the blasted region, in the first image; and
characterizing the first scope of coating removal based on deviations between the blasted region and the un-blasted region; and
wherein setting the first set of blast parameters comprises, in response to the first scope of coating removal falling below a target scope of coating removal, setting the first set of blast parameters by adjusting the nominal set of blast parameters to increase energy input per unit area of the workpiece.

6. The method of claim 5:
wherein accessing the nominal set of blast parameters comprises accessing the nominal set of blast parameters comprising:
a nominal offset distance between the blast nozzle and the workpiece; and
wherein setting the first set of blast parameters by adjusting the nominal set of blast parameters comprises:
decreasing the nominal offset distance to a first offset distance.

7. The method of claim 5:
wherein accessing the nominal set of blast parameters comprises accessing the nominal set of blast parameters comprising:
a nominal feed rate for navigating the blast nozzle over the workpiece; and
a nominal offset angle between an axis of the blast nozzle and a normal vector per unit area on the workpiece; and
wherein setting the first set of blast parameters by adjusting the nominal set of blast parameters comprises:
decreasing the nominal feed rate to a first feed rate; and
decreasing the nominal offset angle to a first offset angle.

8. The method of claim 1:
wherein accessing the first image comprises:
terminating dispensing of blast media toward the workpiece at the first test location;
triggering an actuator to open a shield arranged on the optical sensor; and
capturing the first image at the optical sensor defining the field of view intersecting the first test location at the workpiece;
wherein detecting the first scope of coating removal comprises:
extracting a first set of visual features from the first image;
detecting a blasted region in the first image based on the first set of visual features;
receiving a selection of a substrate material type of the workpiece;
accessing a first template image representing complete blasting of the substrate material type; and
characterizing the first scope of coating removal based on deviations between the blasted region in the first image and the template image; and
wherein setting the first set of blast parameters comprises, in response to the first scope of coating removal falling below a target scope of coating removal, setting the first set of blast parameters by adjusting the nominal set of blast parameters to increase energy input per unit area of the workpiece.

9. The method of claim 1:
wherein accessing the first image comprises:
terminating dispensing of blast media toward the workpiece at the first test location;
triggering an actuator to open a shield arranged on the optical sensor; and
capturing the first image at the optical sensor defining the field of view intersecting the first test location at the workpiece;
wherein detecting the first scope of coating removal comprises:
extracting a first set of visual features from the first image;

interpreting a first surface profile of a blasted region in the first image based on the first set of visual features;

accessing a target surface profile corresponding to the workpiece; and characterizing the first scope of coating removal based on deviations between the first surface profile and the target surface profile; and wherein setting the first set of blast parameters comprises, in response to the first scope of coating removal falling below a target scope of coating removal, setting the first set of blast parameters by adjusting the nominal set of blast parameters to increase energy input per unit area of the workpiece.

10. The method of claim 1, further comprising during the test cycle:

terminating projection dispensing of blast media toward the workpiece at the first test location;

accessing a threshold temperature value corresponding to a substrate material type of the workpiece;

accessing a first temperature value from a contactless temperature sensor intersecting the first test location on the workpiece; and in response to the first temperature value exceeding the threshold temperature value, adjusting the nominal set of blast parameters by decreasing energy input per unit area of the workpiece.

11. The method of claim 1:

wherein accessing receiving the selection of the first test location comprises accessing the first test location on a front side of the workpiece; and further comprising during the test cycle:

accessing a threshold temperature value corresponding to a substrate material type of the workpiece;

generating a prompt to locate a temperature sensor on a rear side of the workpiece adjacent the first test location;

serving the prompt to an operator device associated with an operator overseeing a blasting process of the workpiece; and during a first time period while dispensing blast media toward the workpiece at the first test location:

accessing a timeseries of temperature values from the temperature sensor; and in response to the timeseries of temperature values approaching the threshold temperature value, deviating the nominal set of blast parameters to decrease energy input to the first test location.

12. The method of claim 1:

further comprising, during the test cycle:

accessing a set of substrate characteristics corresponding to a substrate of the workpiece; and accessing a set of coating characteristics corresponding to a coating arranged over the substrate of the workpiece; and wherein the nominal set of blast parameters comprises, based on the set of substrate characteristics and the set of coating characteristics, accessing the nominal set of blast parameters comprising:

a nominal feed rate for navigating the blast nozzle over the workpiece;

a nominal offset angle between an axis of the blast nozzle and a normal vector per unit area on the workpiece;

a nominal offset distance between the blast nozzle and the workpiece; and a nominal pressure for dispensing blast media toward the workpiece from the blast nozzle.

13. The method of claim 1:

wherein generating the first tool path comprises:

defining the first toolpath comprising a first sequence of keypoints located on the virtual model; and for each keypoint in the first sequence of keypoints:

calculating a vector normal to the virtual model at a location of the keypoint on the virtual model; and storing the vector in the keypoint; and wherein navigating the blast nozzle across the first workpiece region according to the first toolpath comprises, for a first keypoint in the first sequence of keypoints:

locating the blast nozzle at a first position intersecting the first keypoint;

aligning an axis of the blast nozzle at a first offset angle, in the first set of blast parameters, from a first vector contained in the first keypoint; and aligning an offset distance of the blast nozzle to a first offset distance, in the first set of blast parameters, from the first keypoint.

14. The method of claim 1, wherein navigating the blast nozzle via the set of actuators comprises navigating the blast nozzle via a robotic arm:

supporting the blast nozzle connected to:

an air supply; and a media supply; and arranged on a conveyer:

adjacent a work zone containing the workpiece; and configured to maneuver the robotic arm along a longitudinal axis at the work zone.

15. The method of claim 1, further comprising:

during the processing cycle, for each unit area of the workpiece along the tool path, recording a set of blast parameters over the unit area; and during a review cycle following the processing cycle:

navigating the optical sensor along the first tool path to capture a series of images representing each unit area of the workpiece along the first tool path;

for each unit area of the workpiece:

characterizing a scope of coating removal based on an image, in the series of images, corresponding to the unit area; and deriving a correlation, in a set of correlations, between the set of blast parameters implemented over the unit area, a geometry of the unit area represented in the virtual model, and the scope of coating removal from the unit area; and based on the set of correlations, generating a blasting model representing combinations of blast parameters characteristic of coating removal from the workpiece.

16. The method of claim 15, further comprising:

during a second scan cycle following the review cycle:

accessing a second set of images captured by the optical sensor traversing the scan path over a second workpiece;

compiling the second set of images into a second virtual model of the second workpiece;

for each unit area of the second workpiece represented in the second virtual model, assigning blast parameters, in a second set of blast parameters, to the unit area based on:

the blasting model; and a geometry per the unit area represented in the second virtual model; and generating a second tool path based on the geometry of the second workpiece represented in the second virtual model and the second set of blast parameters; and during a second processing cycle following the second scan cycle:
via the set of actuators, navigating the blast nozzle over the second workpiece region according to the second tool path; and
dispensing blasting media toward the second workpiece according to the second set of blast parameters.

17. A method for media blasting a workpiece comprising:
accessing a virtual model representing a workpiece;
accessing a nominal set of blast parameters;
based on the virtual model, selecting a set of test locations proximal a target region on the workpiece;
during a test cycle, for each test location in the set of test locations:
via a set of actuators, navigating a blast nozzle proximal the test location on the workpiece;
dispensing blast media toward the test location on the workpiece according to the nominal set of blast parameters;
accessing an image from an optical sensor defining a field of view intersecting the test location;
detecting a scope of coating removal from the test location based on the image; and
setting a set of blast parameters based on the nominal set of blast parameters and the scope of coating removal at the test location;
interpolating a map of blast parameters spanning the target region of the workpiece based on the set of blast parameters set at each test location in the set of test locations;
defining a toolpath for the workpiece based on a geometry of the target region of the workpiece represented in the virtual model; and
during a processing cycle:
via the set of actuators, navigating the blast nozzle over the workpiece according to the toolpath; and
dispensing blast media toward the target region of the workpiece according to the map of interpolated blast parameters.

18. The method of claim 17, wherein:
selecting the set of test locations comprises selecting the set of test locations, each test location, in the set of test locations, characterized by a coating quality; and
setting the set of blast parameters comprises setting the blast parameters, in the set of blast parameters, based on the nominal set of blast parameters, the scope of coating removal at the test location, and the coating quality at the test location.

19. The method of claim 17, wherein:
selecting the set of test locations comprises selecting the set of test locations, each test location, in the set of test locations, characterized by a local radius; and
setting the set of blast parameters comprises setting the blast parameters, in the set of blast parameters, based on the nominal set of blast parameters, the scope of coating removal at the test location, and the local radius at the test location.

20. A method comprising:
accessing a virtual model representing a workpiece;
accessing a nominal set of blast parameters;
based on the virtual model, selecting a test location on the workpiece;
during a test cycle:
via a set of actuators, navigating a blast nozzle proximal the test location on the workpiece;
dispensing blast media toward a first side of the workpiece at the test location according to the nominal set of blast parameters;
accessing a timeseries of temperature values from a temperature sensor arranged proximal the test location at a second side, opposite the first side, of the workpiece;
in response to the timeseries of temperature values approaching a threshold temperature value, deviating the nominal set of blast parameters to a decrease energy input to the test location;
accessing an image from the optical sensor defining a field of view intersecting the test location on the workpiece;
detecting a scope of coating removal from the test location on the workpiece based on the first image;
setting a set of blast parameters based on the nominal set of blast parameters and the scope of coating removal; and
generating a tool path for the workpiece based on a geometry of the workpiece represented in the virtual model and the set of blast parameters; and
during a processing cycle:
via the set of actuators, navigating the blast nozzle over the workpiece according to the tool path;
dispensing blast media toward the workpiece according to the set of blast parameters.

* * * * *